March 6, 1945.  L. A. MARTINELLI ET AL  2,370,679
HYDRAULIC SHOCKLESS COUPLING
Filed Dec. 15, 1941  2 Sheets-Sheet 1

INVENTORS
LLOYD A. MARTINELLI
WILLIAM H. TOPP
BY Munn, Liddy, Glaccum & Kane
ATTORNEYS

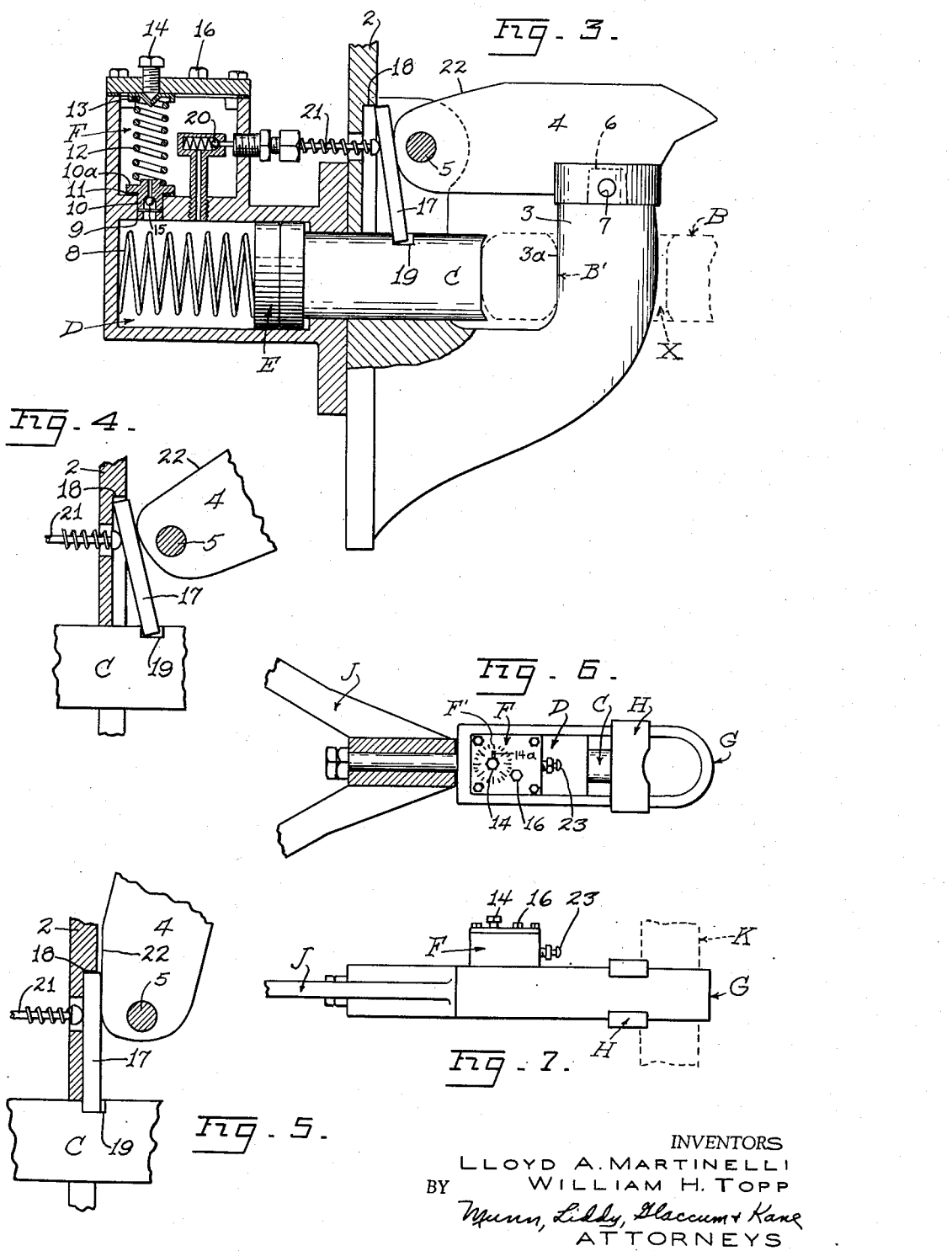

Patented Mar. 6, 1945

2,370,679

UNITED STATES PATENT OFFICE 2,370,679

HYDRAULIC SHOCKLESS COUPLING

Lloyd A. Martinelli, Concord, and William H. Topp, Sacramento, Calif.

Application December 15, 1941, Serial No. 422,950

12 Claims. (Cl. 280—33.15)

It is the present practice to connect a powered and a trailing vehicle together by a pintle and an eye. Usually the powered vehicle carries the pintle, while the trailing vehicle has the eye which drops over the pintle and is carried by the drawbar. The inner diameter of the eye is slightly larger than the outer diameter of the pintle in order to make it easy to connect the eye to the pintle. During a direct pull of the powered vehicle on the towed or trailing vehicle, the eye will be in pulling contact with the pintle and therefore will contact it at a certain point. If now there should be a sudden slackening in the speed of the powered vehicle or if the towed vehicle should gain in momentum, a slack will develop between the eye and pintle, and another portion of the eye will be brought into contact with another portion of the pintle. This relative freedom of movement between the eye and pintle causes it to wear rapidly. A hammering action also develops as the change takes place between a pulling connection and a slack connection.

In large trucks and trailers a gross trailer load of thirty four thousand pounds will require an initial drawbar pull of about eight hundred pounds to start it in motion, and after the trailer is once in motion a continual pull of between sixty to ninety pounds will keep it moving. If a slack in the pulling contact between the pintle and eye should suddenly develop, a tremendous force will be exerted by the trailer on the eye which would have to be absorbed by the pintle as another portion of the eye contacted therewith. We are aware of a mechanism for exerting a pressure on the eye or pintle for holding them in pulling contact under about an eight or nine hundred pounds pressure, but this will quickly wear the parts at their point of contact because the eye will continually shift its position angularly as the vehicles turn into different angular positions with respect to each other.

The principal object of our invention is to provide a device which will maintain a very light pressure on the pintle and eye to hold them in pulling contact with each other into which they have already been moved by one vehicle pulling the other, and which will resist a high pressure to move the parts out of pulling contact. In this way wear between the parts caused by undue contact pressure being applied is obviated and the hammering action resulting from a sudden slack between the pintle and eye and the moving of another eye portion against the pintle, is eliminated.

A further object of our invention is to provide a device of the type described which is self-contained and may be attached to any vehicle. No connections need be made between the device and the vehicle engine and the device is entirely automatic in operation. Novel means is provided for permitting the eye to move into slack position with the pintle when the force for causing this movement exceeds a predetermined pressure. The device has adjustable means for permitting a slack movement to take place between the eye and pintle at any predetermined force applied. Novel means is also provided for permitting the eye to move into slack position when it is desired to remove it from the pintle.

Our invention is illustrated in the accompanying drawings forming a part of this application, in which:

Figure 3 is a longitudinal section through the device, portions being shown in elevation;

Figure 4 is a view of a portion of Figure 3 illustrating certain parts in a different position;

Figure 5 is a view of a similar portion illustrating the same parts in a still different position;

Figure 6 is a plan view partly in section of a modified form of the invention; and Figure 7 is a side elevation of Figure 6.

While we have shown only the preferred forms of our invention, it should be understood that various changes or modifications may be made within the scope of the appended claims without departing from the spirit and scope of the invention.

Figure 1:
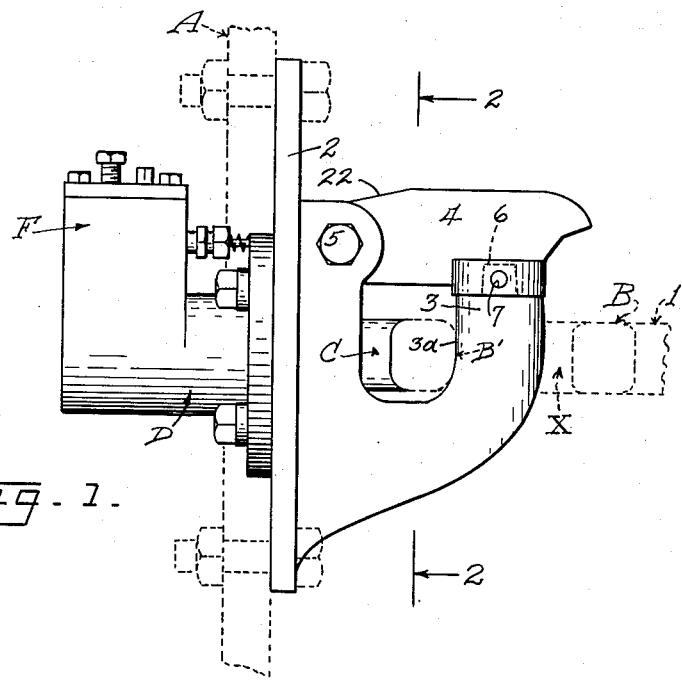
Figure 1 is a side elevation of the device.
Figure 2:
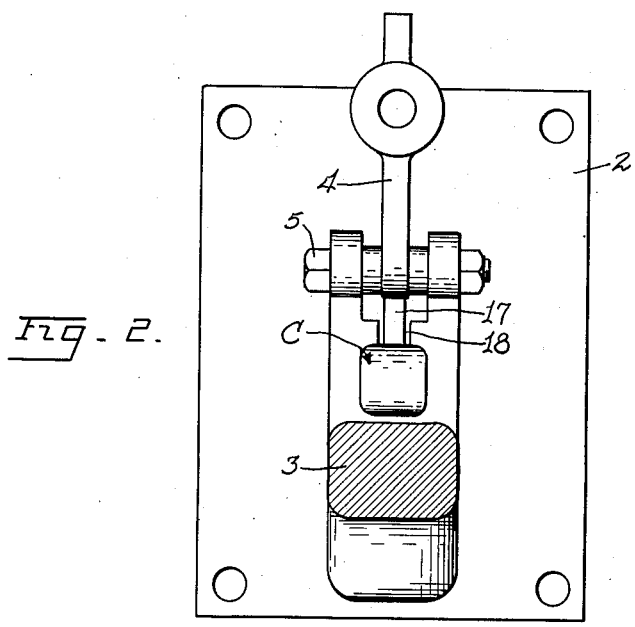
Figure 2 is a section along the line 2—2 of Figure 1.

In carrying out our invention we make use of a pulling vehicle, indicated generally at A in Figure 1, and we further make use of an eye B that is integral with a drawbar 1, which in turn is connected to the towed or trailing vehicle (not shown). Our device consists of a base plate 2 that carries a pintle 3, the pintle forming an integral part with the base. The top of the pintle is designed to receive the eye B of the trailer, and a keeper or an arm 4 is pivoted at 5 and is designed to cover the pintle so as to hold the eye against accidental removal. If desired, the arm 4 may have a recess for receiving a projection 6, see Figure 1, carried by the pintle. The arm and the projection have aligned openings 7 for receiving a removable pin which will secure the keeper 4 against accidentally swinging into open position.

In Figure 3 we show the eye B in pulling contact with the pintle 3, which means that the portion B' of the eye contacts with the portion 3a of the pintle. It will be noted that a space, indicated at X, is provided between the opposite side of the pintle and the adjacent portion of the eye opening. In the normal operation of a powered vehicle A and a towed or trailing vehicle, the pulling contact between the eye B and the pintle 3 will continue so long as the towed vehicle is deriving its power from the powered vehicle. However, should the pulling vehicle suddenly slacken its speed, as when the engine is decelerated or when the brakes are applied, the trailing vehicle will have a tendency to move forward with respect to the powered vehicle and this will cause the space X to disappear and the eye B will move into slack position and will contact with the opposite side of the pintle. This results in a hammer action being delivered to the pintle and absorbed by the pintle and eye. The eye and pintle are subjected to undue wear from this hammering action. The same action develops should the vehicles be traveling down hill and the trailing vehicle have a tendency to move faster than the powered vehicle.

We are aware of a device for holding the eye and pintle in pulling contact, but a great force is used to effect this contact, the force being somewhere between eight hundred and nine hundred pounds pressure, and this force is sufficient to cause the eye and pintle to wear unduly as one turns with respect to the other. To overcome this disadvantage of undue wear, we have provided a ram C that is moved against the eye B by a light coiled spring 8, see Figure 3. The spring will exert a small force against the ram of just sufficient strength to move the ram against the eye when the eye contacts with the pintle in pulling position. This slight force will exert a negligible wear on the eye, while the latter rotates on the pintle during the turning of the two vehicles with respect to each other during normal travel. The gist of our invention lies in the fact that we provide novel means for preventing a retraction of the ram after it once contacts with the eye, and this will hold the eye in continuous pulling contact with the pintle until a pressure greater than a predetermined point is reached, whereupon the ram will be free to move into a retracted position by a mechanism hereinafter described.

The novel means for holding the ram against retraction comprises a hydraulic cylinder D in which a piston E is mounted. The piston is connected to the ram and the spring 8 bears against the piston for urging the ram to the right in Figure 3. A liquid supply reservoir F is disposed above the cylinder D and a passage 9 places the reservoir in communication with the cylinder. The release valve has a reduced portion loosely fitting in the passage 9 and has a flanged top 10a that bears against a gasket 11 for providing a liquid tight seal between the reservoir and the cylinder. The valve 10 prevents a flow of fluid from the reservoir into the cylinder but permits a reverse flow when the liquid in the cylinder reaches a predetermined pressure.

We provide novel means for controlling the opening of the valve 10 so that the ram will withstand a predetermined pressure before retracting. Retraction of the ram is made possible when the valve 10 opens and permits the fluid in the cylinder D to return to the reservoir F. A coiled spring 12 has one end bearing against the valve 10 and has its other end received in a cup-shaped member 13 that in turn has a central recess for receiving an adjusting screw 14. The screw 14 projects through the top of the reservoir and may be turned from a point exterior of the reservoir. The turning of the screw will change the pressure exerted by the spring against the valve 10. If desired, a pin 14a, see Figure 6, on the screw may move over marks F' on the exterior surface of the reservoir for indicating the pressure the ram C will withstand before it will retract. It is obvious that in order to move the ram C to the right in Figure 3, fluid must flow from the reservoir F in the cylinder D to relieve the vacuum in the cylinder. A small check valve 15 is placed in the release valve 10 and will permit fluid to flow from the reservoir into the cylinder but will prevent a return flow. In order to relieve any vacuum in the reservoir F, a filling plug 16 is provided with an air vent therein (not shown) which places the reservoir in continual communication with the atmosphere. It will be seen from the construction thus far disclosed that the ram C is moved against the eye B under a very slight pressure, but the ram C is prevented from retracting until the pressure of the eye B against the ram exceeds the force of the spring 12 exerted against the valve 10.

We provide novel means for automatically permitting a flow of fluid from the cylinder D into the reservoir F when the keeper 4 is raised to free the eye from the pintle. This fluid flow is necessary to free the eye because the ram C must be retracted before the eye can be removed. The keeper is mechanically connected to the ram for effecting its retraction after a fluid passageway has been established between the cylinder and the reservoir. In Figures 3, 4 and 5 we show a floating lever 17 with its upper end received in a recess 18 provided in the base plate 2 and its lower end received in a recess 19 formed in the ram C. An auxiliary check valve 20 places the cylinder D in communication with the reservoir F when this check valve is opened. A spring pressed plunger 21 when depressed will open the auxiliary check valve and permit the fluid in the cylinder to flow back into the reservoir when the ram is retracted. The spring pressed plunger 21 has its end bearing against the lever 17 and when the keeper is in closed position the plunger 21 is extended and the check valve 20 is closed.

Should the operator desire to remove the eye from the pintle, he first swings the keeper 4 upwardly about the pivot 5, and the initial movement of the keeper will force the upper portion of the lever 17 against the plunger 21 to open the check valve 20. This initial movement is shown in Figure 4, and the lever during this movement will fulcrum in the recess 19 because the ram C cannot be retracted until a fluid release is provided for the cylinder D. The opening of the auxiliary check valve 20 provides this fluid release for the cylinder and therefore a further swinging of the keeper 4 about the pivot 5, as indicated in Figure 5, will cause the lever 17 to fulcrum about its upper end as a pivot, this end bearing against the inner wall of the recess 18. The fulcruming of the lever about its upper end as a pivot will cause the lower lever end to move to the left in Figure 5 and retract the ram C which is now free to move. The eye may now be lifted off the pintle. It will further be noted in Figure 5 that the keeper when in fully raised position brings a flat surface 22 against the lever 17 and the parts will therefore stay in raised position, i. e., the position shown in Figure 5, until the keeper 4 is manually swung into closed position. During the closing movement of the keeper, the lever 17 will free the plunger 21 to permit it to return to normal position and the auxiliary check valve 20 will close. The spring 8 will now move the ram C to the right in Figure 3 until it comes into contact with the eye B.

From the foregoing description of the various parts of the device, the operation thereof may be readily understood.

We have already described how the ram will exert little force against the eye yet withstand a great force before retracting. The device will not interfere with the normal pulling contact between the eye and the pintle, and the ram only comes into active resistance to the eye when there is a tendency for the eye to move into slack position caused by the trailing vehicle moving closer to the powered vehicle. The eye is free to rotate on the pintle and the ram C will permit this rotation. Should wear take place in the eye during normal use, the wear would occur on the portions 3a and B' of the pintle and eye respectively. This will elongate the recess in the eye and reduce the thickness of the eye at the point where it is in contact with the pintle and with the ram. During any turning movement between the two vehicles, this reduced eye portion will swing away from the ram and a thicker eye portion will enter between the pintle and the ram. The ram will permit this movement when the pressure exerted by the ever thickening eye portion exceeds the pressure exerted by the spring 12 against the valve 10.

The ram C acts as a shock absorber for the eye and the trailing vehicle. When the trailing vehicle has a tendency to move the eye into slack position, the ram will resist this movement until the pressure of the eye against the ram exceeds the pressure of the spring 12 on the valve 10. All hammering action of the eye against the pintle is done away with by our construction. The device will automatically take up wear on the eye as already explained.

In Figures 6 and 7, we show a slightly modified form of the invention in which the eye G is altered in size by a pintle engaging member H. The member H is connected to the ram C and the ram forms a part of the device already explained. Similar parts will be given like reference numerals. In place of the spring pressed plunger 21 we provide a manually depressible plunger 23. When the plunger 23 is depressed, the auxiliary check valve 20 is opened and this will permit the member H to be retracted. The eye G in Figure 6 is connected to a drawbar J and the eye is free to rotate about a longitudinal axis in the drawbar. Figure 7 illustrates the member H moving against a pintle K with slight force. The member H will not retract until a predetermined pressure is exerted by the pintle against the member.

The operation of this form of the device is identical to that of the form already described. The only difference is that the member H moves against the pintle K, whereas in the other form the ram C moves against the eye B.

We claim:

1. The combination with a pintle and a draw bar eye interconnecting two vehicles together for permitting turning movement therebetween, of means including a ram engaging with the parts with very slight pressure for maintaining the pintle and eye in the position they assume when one vehicle is pulling the other, hydraulic means for holding the ram against retraction caused by any tendency for slack to develop between the eye and pintle, and an automatic release for the hydraulic means adjustable to varying pressures for permitting the ram to retract when pressure above a predetermined point is exerted thereagainst.

2. In combination, a ram movable in one direction under a slight spring pressure, a cylinder for receiving the ram and having a fluid holding reservoir communicating therewith so that the fluid in the reservoir will keep the cylinder filled continually and will bear against the rear of the ram, a check valve placed between the reservoir and cylinder for permitting only a one way flow of the fluid from the reservoir to the cylinder as the ram is extended by the spring pressure, an adjustable pressure regulated release valve independent of the spring pressure on the ram for permitting fluid to pass from the cylinder back into the reservoir when a predetermined pressure is applied to the ram for retracting it, and an auxiliary release valve for permitting fluid to flow from the cylinder to the reservoir to permit the manual retraction of the ram.

3. In combination, a ram movable in one direction under a slight pressure, a cylinder for receiving the ram and having a fluid holding reservoir communicating therewith so that the fluid in the reservoir will keep the cylinder filled continually, a check valve placed between the reservoir and cylinder for permitting only a one way flow of the fluid from the reservoir to the cylinder, an adjustable pressure regulated release valve for permitting fluid to pass from the cylinder back into the reservoir when a predetermined pressure is applied to the ram for retracting it, an auxiliary release valve for permitting fluid to flow from the cylinder to the reservoir, and means including a lever for initially opening the auxiliary release valve and subsequently retracting the ram.

4. In combination, a cylinder, a piston mounted therein, a ram actuated by the piston and projecting through the cylinder, a light spring for projecting the ram from the cylinder, a reservoir for holding a fluid, a check valve for permitting flow of the fluid only from the reservoir to the cylinder, a pressure regulated release valve for permitting a return flow of fluid from the cylinder to the reservoir when a predetermined force is applied to the ram for retracting it, an auxiliary release valve for permitting fluid flow from the cylinder to the reservoir, a pintle for removably receiving a draw-bar eye, said ram bearing against the eye with light pressure, a keeper arm swingable onto the pintle for holding the eye, and a lever actuated by moving the keeper away from the arm, said lever initially opening the auxiliary release valve and then retracting the ram for freeing the eye.

5. The combination with an elongated eye, a pintle engaging member slidable along the sides of the eye, a light spring means including a ram and a piston for urging the member toward the looped end of the eye, hydraulic means for preventing return movement of the piston, an adjustable release valve for the hydraulic means for permitting return movement of the piston when the pressure on the member to retract it reaches a predetermined point, and a manually controlled release valve for permitting the member to be retracted.

6. The combination with a pintle and a draw bar eye interconnecting two vehicles together for permitting turning movement therebetween, of means including a ram engaging with the parts with very slight pressure for maintaining the pintle and eye in the position they assume when one vehicle is pulling the other, hydraulic means for holding the ram against retraction caused by any tendency for slack to develop between the eye and pintle, and an automatic release for the hydraulic means for permitting the ram to retract when pressure above a predetermined point is exerted thereagainst.

7. In a device of the type described, a ram, a cylinder for receiving the ram and being filled with fluid so as to prevent the normal retraction of the ram, a reservoir communicating with the cylinder, a release valve for permitting fluid to flow from the cylinder to the reservoir, and means including a lever for initially opening the release valve and subsequently retracting the ram, whereby the ram will force the excess fluid past the valve and into the reservoir.

8. In combination, a pintle carried by one vehicle, an eye rotatable thereon and carried by another vehicle, a member exerting a slight force on the eye for holding it in continuous contact with the pintle while permitting the eye to rotate around the pintle without creating undue wear between the pintle and eye during the turning of one vehicle with the other, hydraulic means for preventing retraction of the member should the eye have any tendency to move thereagainst caused by one vehicle moving toward the other, said hydraulic means including a liquid-holding cylinder against which the member bears, and an adjustable release valve for the cylinder adapted to open automatically when the retracting pressure on the member exceeds a predetermined force.

9. In combination, a pintle carried by one vehicle, an eye rotatable thereon and carried by another vehicle, a member exerting a slight force on the eye for holding it in continuous contact with the pintle while permitting the eye to rotate around the pintle without creating undue wear between the pintle and eye during the turning of one vehicle with the other, means for preventing retraction of the member should the eye have any tendency to move thereagainst caused by one vehicle moving toward the other, said hydraulic means including a liquid-holding cylinder against which the member bears, an adjustable release valve for the cylinder adapted to open automatically when the retracting pressure on the member exceeds a predetermined force, an auxiliary release valve for the cylinder, and a manually actuated lever for initially opening the auxiliary release valve and then retracting the member.

10. The combination with a pintle and a draw bar eye interconnecting two vehicles together, of yielding means including a ram for urging the ram to move the pintle and eye into continuous pulling contact with each other with practically negligible pressure from said means, said means also including a liquid filled reservoir for receiving one end of the ram and exerting no appreciable pressure against the ram for moving it in the same direction as the ram is moved by the yielding means, the liquid in the reservoir automatically opposing a relatively high pressure to move the ram in the opposite direction caused by the pintle and eye endeavoring to move out of pulling contact with respect to each other.

11. The combination with a pintle and a draw bar eye interconnecting two vehicles together, of yielding means for urging the pintle and eye into continuous pulling contact with each other with practically negligible pressure from said means, said means automatically opposing a relatively high pressure to move the pintle and eye out of pulling contact and including a spring-pressed ram movable under a continuous slight pressure to hold the pintle and eye in the position they assume when one vehicle is pulling the other while still permitting a turning movement between the vehicles, and hydraulically controlled means including a liquid filled reservoir receiving one end of the ram and exerting no appreciable pressure against the ram for moving it in the same direction as the ram is moved by the spring, said hydraulically controlled means holding the ram from retraction should the towed vehicle move forwardly relative to the towing vehicle and tend to produce a slack in the pintle and eye connection, whereby the jerking between the eye and pintle is obviated.

12. In combination, a pintle carried by one vehicle, an eye rotatable thereon and carried by another vehicle, a spring-pressed member exerting a very slight force on the eye for holding it in continuous contact with the pintle while permitting the eye to rotate around the pintle without creating undue wear between the pintle and eye during the turning of one vehicle with respect to the other, and normally static hydraulic means contacting with the member and while not urging the member against the eye, being immediately responsive for preventing retraction of the member should the eye have any tendency to move thereagainst caused by one vehicle moving toward the other.

LLOYD A. MARTINELLI.
WILLIAM H. TOPP.